United States Patent [19]

De Witte

[11] 3,861,704

[45] Jan. 21, 1975

[54] STANDARD BULK CART

[75] Inventor: Raymond E. De Witte, Purchase, N.Y.

[73] Assignee: The Coca-Cola Co., Atlanta, Ga.

[22] Filed: Oct. 15, 1973

[21] Appl. No.: 406,451

[52] U.S. Cl. .................................... 280/79.3
[51] Int. Cl. .................................... B62d 53/06
[58] Field of Search .............. 280/79.3, 79.2, 47.34, 280/179 R; 160/327, 328, 329

[56] References Cited

UNITED STATES PATENTS

| | | | |
|---|---|---|---|
| 2,950,126 | 8/1960 | Armentrout | 280/179 R |
| 3,313,378 | 4/1967 | Freeman | 280/47.34 X |
| 3,420,379 | 1/1969 | Berryman | 280/79.3 |

FOREIGN PATENTS OR APPLICATIONS

| | | | |
|---|---|---|---|
| 1,220,264 | 6/1966 | Germany | 280/79.3 |

*Primary Examiner*—Robert R. Song
*Attorney, Agent, or Firm*—W. Dexter Brooks

[57] ABSTRACT

A Standard Bulk Cart is described which is capable of being utilized as a mobile container for transporting stacked products from a production facility or warehouse to a retail outlet, and which can also be used for collecting empty returnable packages or merchandizing or displaying the stacked products to the consumer when located at the outlet. The Standard Bulk Cart is capable of being transported to and from the retail outlets by means of specialized vehicles designed for the soft drink industry or by conventional tractor-trailer type vehicles. The Cart is of rugged construction, capable of withstanding the stress and abuse of being transported to and from manufacturing and sales points, and when used as a display and/or collection cart, presents a reliable, readily accessible cart for the customer to load or unload product therefrom. The Cart includes a knock down feature so as to provide an easily separable receptacle bin which may be quickly knocked down for shipping or storage. The cart also includes a cluster bar arrangement that may be releasably detached from the cargo bed upon actuation of a foot stirrup to permit prompt access to the interior of the cart for handling a product contained therein.

9 Claims, 4 Drawing Figures

STANDARD BULK CART

BACKGROUND OF THE INVENTION

The present invention relates to a mobile, four-wheeled cart, capable of being utilized as both a mobile container for the transportation of stacked products, such as soft drinks, and also as a collection and display cart for the stacked products at the retail outlet.

The transportation of cases of bottled beverages, such as milk, soft drinks, beer and wine and the like by a bottler from a bottling plant to a route distribution point has always been a time consuming and expensive operation. It has heretofore been practiced where these cases were to be delivered, that several basic types of manually operated wheeled transporting devices be employed for handling the cases.

The first and most common type of wheeled device consists of an elongate, normally upwardly and rearwardly projecting material supporting frames with handles at its upper end, a forwardly projecting material engaging and supporting toe plate at its lower end and a pair of laterally spaced support wheels mounted at the lower end of the frame to occur rearwardly thereof. This type of device has become commonly known as a "dolly device."

Dolly devices, such as described above are made in many different and special designs for special uses. For example, specially designed dolly devices with short toe plates, are provided for handling goods in small packages or containers. Such specially designed dolly devices are not suitable for handling large cartons or sacked goods, such as coal or potatoes. Accordingly, specially designed dolly devices with larger or longer toe plates are provided for handling these large cartons and sacked goods.

In addition to the above example, specially designed dolly devices are provided for handling barrels or drums, soft drink cases, appliances and many other goods and materials which present special handling problems.

As a result of the above, a great number of shops, warehouses, stores and common carriers, must purchase, maintain and use a wide variety of dolly devices. The necessity and/or desirability of having several available types or styles of dolly devices is expensive, complicated and troublesome.

Another type of wheeled device that the art has developed and which finds wide use throughout industry includes an elongate horizontally disposed frame with an upwardly projecting handle at one end, a pair of support wheels, on fixed axles, at one end of the frame and a pair of caster type wheels at the other end of the frame. This four-wheeled type of truck is commonly referred to as a "flat bed platform truck" and is widely used to carry or transport goods which are too bulky or of such size and shape that they cannot be advantageously transported on a two wheeled "dolly device."

The latter, second type of truck is widely used in shops, warehouses and stores but is infrequently used by truckers or common carriers, in spite of the frequent need for such a truck. This is primarily due to the fact that such trucks are awkward and difficult to handle, as for instance, they are difficult to load and unload from trucks and similar vehicles. Furthermore, such trucks occupy considerable space and there is a practical limit as to the number of special pieces of work handling equipment a trucker or common carrier can be equipped with.

Under practical circumstances, both types of manually operated wheeled transporting devices have been employed. This resulted in a considerable expense because of increased time requirements for delivery routes and/or increased equipment expenditures.

Moreover, until several years ago, practically all soft drink related products were transported from the plant or warehouse to the retail outlet by conventional bay type route trucks. The product was, in many cases, loaded onto pallets and the pallets were in turn loaded into bays on the route truck. Once the truck arrived at the outlet, the cases were unloaded by hand usually five cases at a time, onto the above described dolly device and then were in turn wheeled into the retail outlet for subsequent sale to the consumer. Of course, prior to selling such products, it was necessary that the cases be off-loaded by hand either into the storage room or directly onto the shelves on which they were displayed to the consumer. Needless to say, this also resulted in a considerable expense because of increased time requirements and equipment expenditures.

These increased expenditures have become disastrous in recent years, since there has been a growing trend in the industry to shift compensation for the delivery salesman function from a base plus commission to an hourly basis. One result of this has been the equation of time and money in terms of route delivery. Thus, by decreasing the time requirement of route delivery, substantial monetary savings can be achieved. The advent of bulk delivery eliminated a sizable portion of the handling involved between the plant or warehouse and the shelf at the retail outlet. The main idea behind bulk delivery was to transport product by means in which a person could handle a greater number of cases more easily in less time than by the previous means of handling individual cases from a conventional route truck and associated distribution equipment.

It was discovered as an outgrowth of the bulk delivery system that the transportation bulk cart formed the nucleas of the bulk delivery system. Thereafter, as the systems were refined, product was loaded into various types of carts at the plant, and the carts were used to secure the product while in route to the sales outlet on a high capacity vehicle that was capable of handling distribution carts. Once at the sales outlet, the carts were wheeled from the vehicle to the storage room or to the shelves to be merchandized. Although considerable handling was eliminated with bulk cart delivery and more cases could be delivered in a shorter time with less physical effort, there was found that some handling was still involved at the outlet in order to load the shelves with the product. This function normally was accomplished by either a merchandizer from the soft drink company or by the sales outlet personnel.

Some outlets started a procedure of using mobile carts that could be loaded in the rear of the store, and subsequently wheeled to the beverage department for actually displaying the product in the carts. These carts were usually of a rigid design with either a flat product holding area parallel to the floor or a built-in permanent pitch to product holding areas in order to give the product more stability. For the most part, the ruggedness and construction of these carts prevented them from being used for anything other than an in-store handling cart. However, this procedure of using in-store carts also involved transferring product either from the store room to the merchandising carts or from bulk delivery carts to the merchandising carts.

With handling costs rapidly increasing in the soft drink industry, the necessity arose for both the bottlers and retailers to have a cart that could be loaded in the plant with product ready for the consumer, transported over-the-road by a specialized vehicle or semi-trailer rig, delivered to the outlet, and be used in the store as a storage and/or display cart for the product. It would have to be of rugged enough construction to withstand the abuse and punishment occurring in the plant and during transport to the outlet, and at the same time be asthetically pleasing to the eye of the consumer since it would be adaptable for use as a display cart at the sales outlet. It was also desirable that the cart provide adequate protection for the product during shipment, and be relatively easy to handle all the way from the plant to the sales outlet. It was also believed desirable to have a cart that was easily knocked down for shipping and/or storage purposes and capable of being easily secured and removed from a conveying high capacity vehicle.

Accordingly, there is a need in the industry for the production of a Standard Bulk Cart, preferably of rugged construction, that is capable of being easily assembled and utilized as a mobile container for the transportation of stacked product to and from retail outlets, as a storage and/or display cart for the product and as a collection cart for empty returnable packages at the retail outlet.

OBJECTS OF INVENTION

An object of the present invention is to provide a Standard Bulk Cart that is capable of being utilized as a mobile container for transporting stacked products from a production facility to a retail outlet, displaying the stacked products to the consumer when located at the sales outlet, and which can also be used as a collection cart for empty returnable packages at the retail outlet.

Another object of the present invention is to provide a standard bulk cart of the character referred to herein having a foot operated stirrup assembly associated with the cart base which allows a removable strap cluster bar arrangement to be releasably detached from the base upon actuation of the stirrup and permit prompt access to the interior of the cart for handling a product contained therein.

Another object of the present invention is to provide a standard bulk cart of the character referred to herein wherein several members of the cart are formed integrally so as to provide a knock down cart arrangement and allow the cart to be easily disassembled for shipping or storage purposes.

Another object of the present invention is to provide a standard bulk cart of rugged construction capable of withstanding the stress and abuse of being transported on high capacity vehicles to and from manufacturing and sales points, and when used as a storage, display and/or collection cart, presents a dependable, multi-purpose conveying device for stacked product.

A further object of the present invention is to provide a standard bulk cart having a novel, rigid, durable and compact frame construction; a cart which is easy and economical to manufacture, assemble and disassemble and may be reliably secured within a high capacity vehicle during transit of the cart to and from manufacturing and sales points.

These, other, and further objects, important features, and advantages of the present invention to which attention has not been specifically directed hereinbefore, will be better understood and appreciated by those skilled in the art from the following detailed description of the invention taken in conjunction with the accompanying drawings.

BRIEF DESCRIPTION OF DRAWINGS

The present invention will now be described by way of example, with reference to the accompanying drawings, in which.

DETAILED DESCRIPTION OF INVENTION

Figure 1:
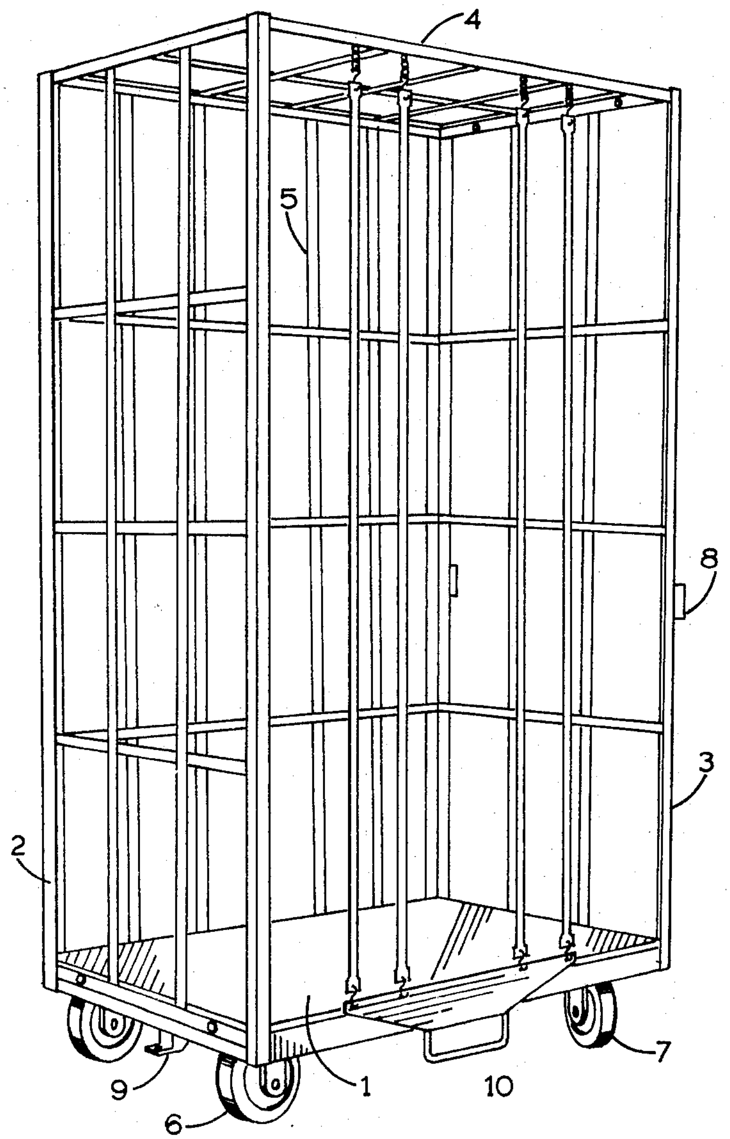
FIG. 1 is a front perspective view of the standard bulk cart with all members fully assembled in accordance with the present invention.
Figure 2:
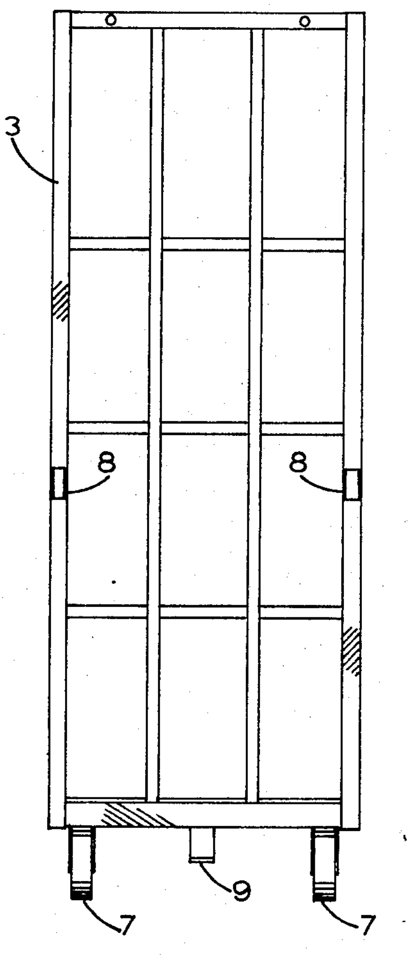
FIG. 2 is a view of the right end of the standard bulk cart as shown in FIG. 1. The locking pin bushings and trailing tongue member are shown, respectively at the middle and bottom of the view.

The standard bulk cart provided by this invention and illustrated in the accompanying drawings includes generally a flat cargo bed 1, on which the payload or stacked product is placed, a left wall 2, a right wall (or bushing wall) 3, a top 4, a back wall 5, two rigid or straight casters 6, two swivel casters 7, two lock pin bushings 8, two trailing tongues 9, and a removable strap cluster bar arrangement 10.

Figure 3:
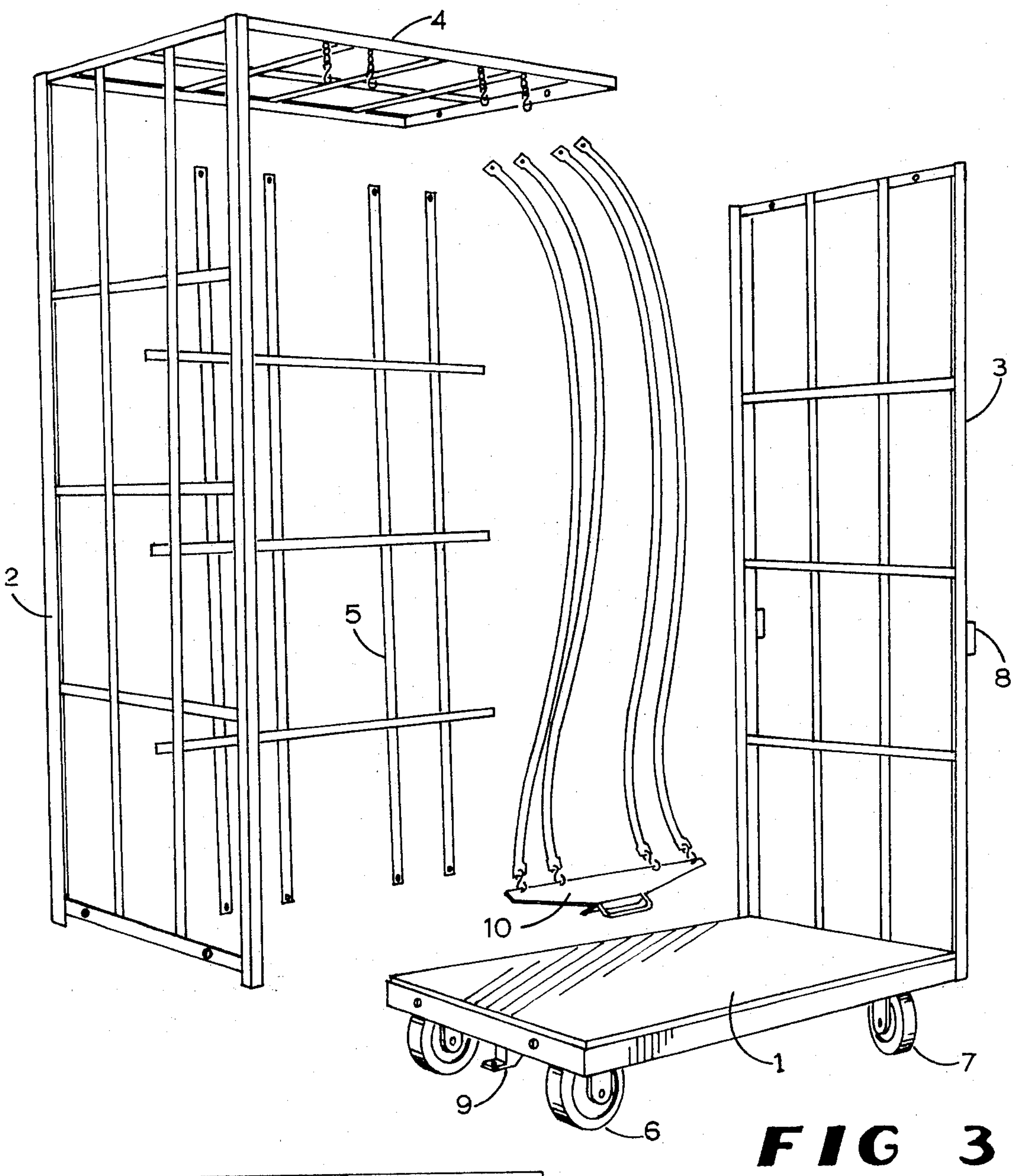
FIG. 3 is a front perspective exploded view of the standard bulk cart illustrated in FIG. 1 enlarged somewhat for purposes of clarity. The removable strap cluster bar arrangement is shown in the center of the view.
Figure 4:
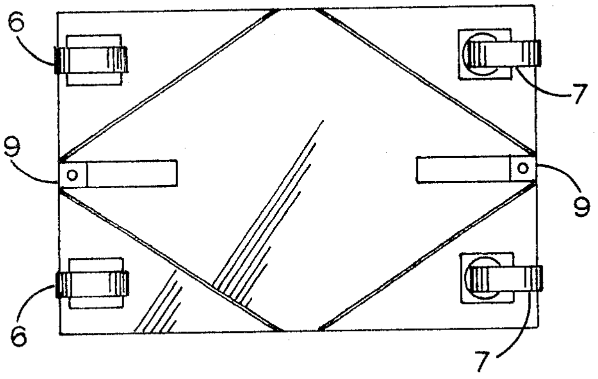
FIG. 4 is a view of the underside of the cart base as shown in FIG. 1, looking perpendicularly at the longitudinal axis of movement of the cart.

The cargo bed 1 is constructed of flat sheet steel with a supporting framework. Attached to the cargo bed and framework unit are two rigid casters 6 on the left end and two swivel casters 7 on the right end. The cargo bed 1 (See FIG. 1) is manufactured integrally with the right wall 3 and the top 4 is manufactured integrally with the left wall 2. As illustrated in FIG. 3, the two integrally formed portions are L-shaped portions which may be stacked in a nested fashion during shipping or storage. The two integrally formed L-shaped portions are adapted to being secured to back wall 5 to form a cart. Any conventional securing means may be used to secure the composite structure together. This composite structure of the cargo bed 1, right wall 3, left wall 2, back wall 5, and top 4 forms a cargo holding area in the form of a rectangular solid with one open side. The entire structure may be fabricated from angle iron, formed channel incorporating an offset (elongated) leg, channel tubing, and/or crimped flat steel stock and may be a combination of welded and bolted construction.

On each end of the cart is a trailing tongue 9 which when used in conjunction with a U-shaped pin allows the bulk carts to be trailed and pulled along together by a fork lift or small tractor.

In actual use, the cart is loaded with product on the cargo bed 1. Once loaded, the payload is restrained from falling out of the cart by a removable cluster bar arrangement 10. The restraining device 10 may comprise either a series of long rubber straps or a series of long chains with springs attached. The rubber straps or chains and springs are attached to the top 4 of the cart and extend downward to the cargo bed 1 thus enclosing the open side of the cargo area. In order to facilitate the fastening and removal of the restraining straps or chains from the cargo bed, the rubber straps or chains and springs are attached to a single cluster bar or foot plate adjacent to the cargo bed. A loop in the foot plate allows one to push down on the foot plate with his foot which elongates the straps or springs and once below the cargo bed, the foot plate is allowed to move upward slightly so that two tabs on the foot plate hook under the cargo bed. The tension in the straps or chains and springs holds the foot plate in place and thus the open side of the cart is bound by the series of straps or chains with springs attached.

Restraining of the standard bulk cart in the conveying vehicle is accomplished by a double bushing and lock pin assembly 8. On the right wall of the cart are two bushings 8 welded to the cart with their axes vertical to the ground. One is located on the rear most vertical member of the right wall 3 and the other on the front most vertical member of the right wall 3. Both are approximately waist high from the floor.

In the conveying vehicle (not shown) is an assembly known as a lock pin rail assembly. It consists of a sturdily constructed steel rail attached to the inside walls of the vehicle extending down the length of the wall with its axis parallel to the floor of the vehicle. Its axis is approximately waist high from the floor of the vehicle. Welded to this rail is pair of bushings identical to the two bushings on the bulk cart. The bushings are welded to the rail with their axes perpendicular to the floor of the vehicle and spaced from each other by a distance so that when the cart is placed against the rail with either its back wall or open front side flush against the rail, it will fit snugly between the two bushings. The height of the bushings on the rail from the floor is such that when the cart is positioned between them, the cart bushing 8 nearest the rail can be aligned so that it is positioned directly below a rail bushing with their vertical axes coinciding. Welded to the other rail bushing nearest the left end of the cart is a tab or clip which forms a pocket between the tab or clip and the lock pin rail. In this pocket the vertical member of the left wall nearest the rail nests.

Thus, in order to secure a cart in the conveying vehicle, the cart is maneuvered so that one of the corner vertical members of the left wall is positioned between the tab or clip and the rail. The right end of the cart is then maneuvered to bring the cart flush against the rail and the bushing on the cart nearest the rail is aligned with the bushing on the rail. Once the two bushings are aligned, a pin is placed through the bushing on the rail extending through the bushing on the cart. Thus, the cart is secured at both ends, on the right end by the double bushing and pin and on the left end by the corner member nesting in the pocket formed by the rail, the bushing, and the tab or clip.

From the foregoing, it will be apparent that I have provided a novel, highly versatile, rugged and dependable standard bulk cart construction which may be used as a bulk delivery cart for transporting stacked products from a production facility to a retail outlet, displaying the stacked products to the consumer, if desired, when located at the sales outlet, and which can also be used as a collection cart for empty returnable packages at the retail outlet. It will further be seen that a cart construction has been described which may be easily assembled and/or disassembled, and which includes a knock down arrangement to permit the cart to be disassembled for shipping or storage purposes.

It is believed that the present invention, its mode of construction, assembly and operation, and many of its advantages attendant thereto should be readily understood from the foregoing description and it should also be manifest that, while a preferred embodiment of the invention has been shown and described for illustrative purposes, the structural details are nevertheless capable of wide variation within the purview of the artisan. For example, instead of manufacturing right wall 3 and cargo bed 1 as an integral portion, left wall 2 could be manufactured integrally with the cargo bed 1, and right wall 2 could be formed integrally with top 4. Also, while not necessary, any well known caster or pivoting arrangement could be embodied on the bottom of the cargo bed 1, dependent of course on the degree of maneuverability and tiltability desired in the cart. Moreover, the cart could be assembled and disassembled in a different fashion. For example, the cart could be provided with collapsible walls that are secured together at the meeting corners and thus, separable in this fashion for shipping and storage purposes.

It is believed that the present invention, its modus operandi, and many of the advantages attendant thereto should be understood from the foregoing without further description. It also should be manifest that the present invention is capable of wide variation within the purview of the invention as defined in the appended claims.

The embodiment of the invention in which an exclusive property right is claimed are defined as follows:

1. A standard bulk cart adapted for transporting stacked product from a production facility to a retail outlet and either displaying said products or collecting returnable empty packages at the retail outlet, including the combination of a cargo bed, a back panel, a top panel, a pair of end panels and a plurality of castors and being bounded on the back side by said back panel, on the top side by said top panel and on the end sides by said two end panels, and a removable cluster bar arrangement attached to the top panel of the cart and extending down to the cargo bed so as to enclose the one open front side of the cart, said cluster bar arrangement comprising a series of long straps which are each connected to a spring means at the upper end of said straps and to a single foot plate member at the lower end of said straps, said spring means being attached to the top panel of said cart and said foot plate member locking said removable cluster bar arrangement to the cargo bed, all of said structural elements being releaseably secured together to form a rectangular receptacle bin when assembled, while at the same time defining a cart that may be easily disassembled and the elements stacked in a nested fashion during shipping or storage.

2. A standard bulk cart as defined in claim 1, wherein said cargo bed is constructed of flat sheet steel, and said back panel, top panel, and pair of end panels are constructed of angle iron, formed channel incorporating an offset (elongated) leg, and crimped flat steel stock, and further wherein one of said end panels is provided with a pair of lock pin bushings with their axes vertical to the ground, said bushings being adaptable to lock the cart to a high capacity vehicle during transit from a production facility to retail outlet.

3. A standard bulk cart as defined in claim 2 wherein the cargo bed of cart is provided with a trailing tongue member at each of the respective ends thereof so as to allow a plurality of said carts to be trailed and pulled along together by a fork lift truck or small trailer.

4. A standard bulk cart as defined in claim 1, wherein cargo bed is manufactured integrally with one of said end panels to form a first L-shaped integral portion, and further wherein the top panel is manufactured integrally with the remaining end panel to form a second L-shaped integral portion, said first and second integral portions being capable of being secured together and to the back panel to form said rectangular receptacle bin when assembled, and further allowing said first and second integral portions, when disassembled, to be stacked in a nested fashion during shipping or storage.

5. A standard bulk cart adapted for transporting stacked product from a production facility to a retail outlet and either displaying said products or collecting empty returnable packages at the retail outlet, including the combination of a cargo bed, a back panel, top panel, a pair of end panels, and a plurality of castors, said cargo bed being supported and mounted on said castors and being bounded on the back side by said back panel, on the top side by said top panel and on the end sides by said two end panels, and further wherein a cluster bar arrangement is provided to enclose the one open side of the cart, said cluster bar arrangement comprising a series of long straps which are each connected to a spring means at the upper end of said straps and to a single foot plate member at the lower end of straps, said spring means being attached to the top panel of said cart and said foot plate member locking said movable cluster bar arrangement to the cargo bed, all of said structural elements forming a rectangular solid, and further wherein one of said end panels is provided with a pair of lock pin bushings with their axes vertical to the ground, said bushings being adapted to lock the cart to a high capacity vehicle during transit from a production facility to a retail outlet, and further wherein the cargo bed of the cart is provided with a trailing tongue member at each of the respective ends thereof so as to allow a plurality of said carts to be trailed and pulled along together by a fork lift truck or small trailer.

6. A standard bulk cart as defined in claim 5, wherein cargo bed is manufactured integrally with one of said end panels to form a first L-shaped integral portion, and further wherein the top panel is manufactured integrally with the remaining end panel to form a second L-shaped integral portion, said first and second integral portions being capable of being stacked in a nested fashion when the cart is knocked down for shipping or storage.

7. A standard bulk cart as defined in claim 5, wherein the cluster bar arrangement comprises a series of chains which are individually connected to spring means at the upper end of chains and to a single foot plate member at the lower end of said chains, said spring means in turn being attached to top panel of said cart and said foot plate member being adapted to lock the removable cluster bar arrangement to the cargo bed, and thus enclosing one open side of cart.

8. A standard bulk cart as defined in claim 5, wherein a pair of straight castors are mounted on one end of the cargo bed and a pair of permanent swivel castors are mounted on the opposite end of the cargo bed, said castor arrangement allowing the cart excellent maneuverability when wheeled from production facility to retail outlet.

9. A standard bulk cart adapted for transporting stacked product from a production facility to a retail outlet and either displaying said products or collecting returnable empty packages at the retail outlet, including the combination of a cargo bed, a back panel, a top panel, a pair of end panels and a plurality of castors and being bounded on the back side by said back panel, on the top side by said top panel and on the end sides by said two end panels, and a removable cluster bar arrangement attached to the top panel of the cart and extending down to the cargo bed so as to enclose the one open front side of the cart, said cluster bar arrangement comprising a series of chains which are each connected to a spring means at the upper end of the chains and to a single foot plate member at the lower end of said chains, said spring means being attached to the top of said cart and said foot plate member locking said removable cluster bar arrangement to the cargo bed, all of said structural elements being releaseably secured together to form a rectangular receptacle bin when assembled, while at the same time defining a cart that may be easily disassembled and the elements stacked in a nested fashion during shipping or storage.

* * * * *